United States Patent
Pang et al.

(10) Patent No.: US 7,061,894 B2
(45) Date of Patent: Jun. 13, 2006

(54) SYSTEM AND METHOD FOR PROVIDING VOICE COMMUNICATIONS FOR RADIO NETWORK

(75) Inventors: Ai-Chun Pang, Hsin-chu (TW); Yi-Bing Lin, Taichung (TW); Yieh-Ran Haung, Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 799 days.

(21) Appl. No.: 09/922,750

(22) Filed: Aug. 7, 2001

(65) Prior Publication Data

US 2003/0043762 A1 Mar. 6, 2003

(51) Int. Cl.
*H04L 12/28* (2006.01)
*H04L 12/66* (2006.01)
*H04Q 7/20* (2006.01)
*H04Q 7/24* (2006.01)

(52) U.S. Cl. .................. 370/338; 370/349; 370/352; 370/401; 455/411; 455/435.1; 455/445

(58) Field of Classification Search .............. 370/252, 370/331, 349, 352, 353, 401, 260, 338; 455/555, 455/411, 435.1, 445
See application file for complete search history.

(56) References Cited

U.S. PATENT DOCUMENTS

| | | |
|---|---|---|
| 5,793,762 A | 8/1998 | Penners et al. |
| 5,867,495 A | 2/1999 | Elliott et al. |
| 5,953,331 A * | 9/1999 | Duncan et al. ............. 370/352 |
| 6,122,263 A | 9/2000 | Dahlin et al. |
| 6,128,304 A | 10/2000 | Gardell et al. |
| 6,134,235 A | 10/2000 | Goldman et al. |
| 6,141,341 A | 10/2000 | Jones et al. |
| 6,167,040 A | 12/2000 | Haeggstrom |
| 6,392,999 B1 * | 5/2002 | Liu et al. .................... 370/260 |
| 6,400,950 B1 * | 6/2002 | Patel et al. .............. 455/435.1 |
| 6,434,140 B1 * | 8/2002 | Barany et al. .............. 370/352 |
| 6,463,055 B1 * | 10/2002 | Lupien et al. .............. 370/353 |

(Continued)

FOREIGN PATENT DOCUMENTS

EP 0984641 A2 3/2000

(Continued)

OTHER PUBLICATIONS

Yi-Bing Lin et al., "vGPRS: A Mechanism for Voice over GPRS", IEEE, 2001, 17 pgs.

(Continued)

*Primary Examiner*—Alpus H. Hsu
(74) *Attorney, Agent, or Firm*—Akin Gump Strauss Hauer & Feld, LLP

(57) ABSTRACT

A system for providing voice communications between an end terminal in a packet data network and a wireless communication device includes a packet communication supporting subsystem, a base station subsystem, and a Voice-over-Internet-Protocol Mobile Switching Center ("VMSC"). The packet communication supporting subsystem communicates with the packet data network and also operates to locate the wireless communication device. The base station subsystem communicates with the wireless communication device, and also communicates the packet data network through the packet communication supporting subsystem in the form of data packets. The VMSC communicates with the packet communication supporting subsystem through a packet-switched network and communicating with the base station subsystem through a circuit-switched network. In addition, registration, call-making, call-releasing, and call-receiving methods are provided for a wireless communication device to provide voice communications between the wireless communication device and an end terminal in a packet data network.

12 Claims, 8 Drawing Sheets

U.S. PATENT DOCUMENTS

| | | | |
|---|---|---|---|
| 6,539,237 B1* | 3/2003 | Sayers et al. | 455/555 |
| 6,614,784 B1* | 9/2003 | Glitho et al. | 370/352 |
| 6,795,444 B1* | 9/2004 | Vo et al. | 370/401 |
| 6,839,323 B1* | 1/2005 | Foti | 370/235 |
| 6,904,027 B1* | 6/2005 | Mukherjee | 370/331 |
| 2001/0043577 A1* | 11/2001 | Barany et al. | 370/328 |

FOREIGN PATENT DOCUMENTS

| | | |
|---|---|---|
| EP | 1017200 A2 | 7/2000 |
| EP | 1028569 A2 | 8/2000 |
| EP | 1054569 A1 | 11/2000 |
| EP | 0984641 A3 | 2/2001 |
| TW | 86110727 | 7/1986 |
| TW | 87109906 | 6/1987 |
| WO | WO 99/33250 | 7/1999 |
| WO | WO 00/35153 | 6/2000 |
| WO | WO 00/35153 A1 | 6/2000 |

OTHER PUBLICATIONS

European Telecommunications Standards Institute; Universal Mobile Telecommunications Systems (UMTS): Feasibility Technical Report—CAMEL Control of VoIP Services (3G TR 21.978 Version 3.0.0 Release 1999).

Universal Mobile Telecommunications System (UMTS) Feasibility Technical Report—CAMEL Control of VoIP Services (3G TR 21.978 version 3.0.0 Release 1999), Copyright © European Telecommunications Standards Institute 2000, 39 pages.

Yi-Bing Lin et al. "vGPRS: A Mechanism for Voice over GPRS." 2001 International Conference on Distributed Computing Systems Workshop, Mesa, Arizona, publication date: Apr. 16-19, 2001, pp. 435-440, 17 pages.

* cited by examiner

SYSTEM AND METHOD FOR PROVIDING VOICE COMMUNICATIONS FOR RADIO NETWORK

BACKGROUND OF THE INVENTION

1. Field of the Invention

This invention pertains in general to systems and methods of providing voice communications for a radio network, and more particularly, to systems and methods of providing Voice-over-Internet-Protocol service for a radio network between a wireless communication device and an end terminal in a packet data network.

2. Description of the Related Art

Global System for Mobile communications ("GSM") has become a popular technology for digital mobile phones and a predominant system for mobile communications in Europe and numerous other countries around the world. GSM, a circuit-switched system, however, is not designed for data communications. As a result, traditional GSM system was not able to provide satisfactory services for data communications, which require high degree of accessibility, high data communication rate, and low cost. General Packet Radio Service ("GPRS") was proposed to resolve the problems of providing data communications in a GSM network. The GPRS operates to provide data packet exchange services under the existing GSM networks and systems. The core network of the GPRS has become part of the second generation of the Time-Division-Multiple-Access ("TDMA") cellular system, or the so-called Interim Standard-136 ("IS-136") TDMA system. IS-136 is a North American digital mobile telephony standard based on TDMA technology. It is a TDMA specification that is used to create in a fully digital second generation system and is backward compatible with analog Advanced Mobile Phone System ("AMPS"). It is expected that the GPRS will be further developed as the core network of the third-generation mobile phone system.

The demand of providing voice communications over the Internet, the so-called Voice-over-Internet-Protocol ("VoIP") service, has been greatly increased in the last several years. Gardell et al. described, in U.S. Pat. No. 6,128,304, a method and apparatus for providing traditional telecommunications services capabilities in a packet-based computer network. Their invention is directed to the application of such services in an H.323-based system but did not apply to wireless systems.

Combining VoIP service with mobile phone systems is one of the important goals of current development efforts. Most recent developments on VoIP service involved providing the service in Internet-based networks, or between an end terminal in the Internet and a traditional telephone terminal. Other GPRS developments focused on the control and efficiency of data packet transmissions. Dahlin et al. proposed, in U.S. Pat. No. 6,122,263, a scheme for providing Internet access for cellular networks, which receives and analyzes packets from a packet-switched fixed network. Their invention enabled routing of wideband traffic from a packet-switched fixed network over a radio interface to a mobile terminal, but did not provide VoIP service for a GPRS network.

FIG. 1 is a block diagram illustrating the main structure of a known GPRS network 10. GPRS network 10 includes several elements of a traditional GSM network, including a Base Transceiver Station ("BTS") 12, a Base Station Controller ("BSC") 14, a Mobile Switching Center ("MSC") 16, a Home Location Register ("HLR") 18, and a Visitor Location Register ("VLR") 20. In addition to traditional GSM network elements, GPRS network 10 further includes a Serving GPRS Support Node ("SGSN") 22 and a Gateway GPRS Support Node ("GGSN") 24. A wireless communication device 30, such as a GSM mobile phone, communicates with GPRS network 10 through BTS 12. SGSN 22 and GGSN 24, through the channeling of other devices, transmits data packets between the wireless communication device 30 and a data network 32, such as a Public Switched Data Network ("PSDN"), or namely, the Internet.

BSC 14 includes a base station Packet Control Unit ("PCU") 14b in order to communicate with SGSN 22. As a result, BSC 14 directs circuit-switched voice signals to MSC 16 and directs packet-switched data to SGSN 22 through the base station PCU 14b. MSC 16 then directs voice signals of ordinary phone calls to a Publicly Switched Telephone Network ("PSTN"). Traditionally, one BSC 14 can communicate with only one SGSN 22. GGSN 24, which communicates with SGSN 22, communicates with external data network 32. SGSN 22 and GGSN 24 are responsible for communicating with HLR 18 and VLR 20 in order to locate a wireless communication device, such as a mobile phone. Therefore, wireless communication device 30 communicates with the Internet in data packet form through the operation of BTS 12, BSC 14, SGSN 22, and GGSN 24. A traditional GPRS network does not support VoIP services because wireless communication device 30 has no capability of processing H.323 packets. Further, no specific schemes are designed to register mobile phones to data network 32 and to allow mobile phones to initiate a phone call to or receive a phone call from an end terminal in data network 32.

To resolve the problem, one of the proposed specifications and studies for third generation mobile systems, 3G TR 21.978, provides a VoIP scheme for a GPRS network. 3G TR 21.978 is a document developed within the third-generation partnership project. The document contains a feasibility report of the proposed VoIP scheme that enables VoIP calls between third-generation (3G) terminals or between a 3G terminal and legacy network terminal, such as second-generation (2G) mobile, Integrated Service Digital Network ("ISDN") or PSTN. The proposed scheme implements an "in-band signaling" concept that transmits signals and voice information with the same Packet-Data-Protocol ("PDP") concept. The scheme requires deactivation of a PDP context previously activated after a mobile phone completes a registration procedure to a H.323 network. Therefore, the mobile phone has to reactivate the PDP context each time a user makes or receives a call. The time needed for establishing a phone conversation channel is increased by the repetition of deactivation and reactivation processes. Further, the scheme proposed in 3G TR 21.978 requires modification of a standard H.323 interface, such as a H.323 gatekeeper, in order to implement the proposed scheme. The required modification limits the application of the proposed scheme.

SUMMARY OF THE INVENTION

Accordingly, the present invention is directed to systems and methods for providing Voice-over-Internet-Protocol service for radio networks that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the systems and methods particularly pointed out in the written description and claims hereof, as well as the appended drawings.

To achieve these and other advantages, and in accordance with the purpose of the invention as embodied and broadly described, the present invention provides systems for providing voice communications between an end terminal in a packet data network and a wireless communication device. In one embodiment of the present invention, a system for providing voice communications includes a packet communication supporting subsystem, a base station subsystem, and a Voice-over-Internet-Protocol Mobile Switching Center ("VMSC"). The packet communication supporting subsystem communicates with the packet data network and also operates to locate the wireless communication device. The base station subsystem communicates with the wireless communication device, and also with the packet data network through the packet communication supporting subsystem in the form of data packets. The Voice-over-Internet-Protocol Mobile Switching Center communicates with the packet communication supporting subsystem through a packet-switched network and communicates with the base station subsystem through a circuit-switched network.

The present invention also provides registration, call-making, call-releasing, and call-receiving methods for a wireless communication device in order to provide voice communications between the wireless communication device and an end terminal in a packet data network.

One embodiment of the registration method of the present invention includes performing a location update of the wireless communication device, authenticating the identity of the wireless communication device, and performing a ciphering procedure for the wireless communication device. After the ciphering procedure, the registration method further includes notifying a Voice-over-Internet-Protocol Mobile Switching Center ("VMSC") of the registration of the wireless communication device, activating the communication between the VMSC and the packet data network, performing a registration of the wireless communication device to the packet data network, and notifying the wireless communication device of the completion of location update. The VMSC in the registration method of the present invention communicates with the wireless communication device through a circuit-switched network and with the end terminal through a packet-switched network.

In one embodiment of the present invention, the activation of the communication between the VMSC and the packet data network in the registration method may include initiating a new Packet Data Protocol ("PDP") context by the VMSC, establishing a record for the wireless communication device by a Gateway GPRS Support Node ("GGSN"), and enabling an Internet-Protocol ("IP") communication between a gatekeeper ("GK") and the VMSC. The GGSN communicates with the packet data network through the GK and with the VMSC through a supporting Serving GPRS Support Node ("SGSN"). In addition, the registration of the wireless communication device to the packet data network may include initiating the registration and notifying the GK of the packet data network by the VMSC with an alias address and a transport address, creating a record by the GK for the mobile phone containing corresponding information of a mobile phone number to an IP address, and notifying the VMSC of the completion of the registration by the GK. The VMSC then establishes Mobility Management ("MM") and PDP context and stores the context in a mobile phone record of the VMSC.

The call-making method of the present invention includes performing channel assignment, authentication, and ciphering setup procedures for the wireless communication device. The call-making method also includes performing a call setup procedure for the wireless communication device, establishing a voice communication channel between a Voice-over-Internet Protocol Mobile Switching Center ("VMSC") and the packet data network, alerting the end terminal and the wireless communication device, and performing a PDP context activation for voice transmission. Finally, the end terminal and the wireless communication device are connected through the VMSC. The VMSC communicates with the wireless communication device through a circuit-switched network and communicates with the end terminal through a packet-switched network.

In one embodiment of the call-making method of the present invention, the step of establishing the voice communication channel includes providing the Internet-Protocol ("IP") address of the end terminal to the VMSC by a gatekeeper ("GK") of the packet data network and communicating with the end terminal by the VMSC to exchange setup and call-proceeding signals between the VMSC and the end terminal. The step of establishing the voice communication channel also includes transmitting Registration, Admission and Status ("RAS") Admission Request ("ARQ") signals to the GK and requesting communications by the end terminal.

The call-releasing method of the present invention includes disconnecting voice communications by the wireless communication device, sending a release signal to the end terminal by a VMSC, exchanging disengage requests between the VMSC and the end terminal, and performing a deactivation procedure. The VMSC communicates with the wireless communication device through a circuit-switched network and communicates with the end terminal through a packet-switched network.

The call-receiving method of the present invention includes establishing a voice communication channel between a VMSC and the end terminal, paging the wireless communication device, and performing channel assignment, authentication, and ciphering setup procedures for the wireless communication device upon receiving a response from the wireless communication device. The call-receiving method further includes performing a call setup procedure for the wireless communication device, alerting the wireless communication device and alerting the end terminal in the packet data network, and connecting the end terminal and the wireless communication device through the VMSC. Finally, the VMSC activates voice communications for the wireless communication device. The VMSC in the call-receiving method communicates with the wireless communication device through a circuit-switched network and communicates with the end terminal through a packet-switched network. In one embodiment of the call-receiving method of the present invention, the step of establishing the voice communication channel includes performing Registration, Admission and Status ("RAS") admission request and setup procedures, sending a setup signal to the VMSC by the end terminal, the VMSC responds to the end terminal with a call proceeding signal and exchanges RAS and ARQ signals with the GK. More particularly, in the RAS admission request and setup procedures, the end terminal transmits a RAS admission request signal to a gatekeeper ("GK") of the packet data network, which contains the identity of the wireless communication device, and the GK responds to the end terminal with a RAS admission confirmation signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

Figure 1:
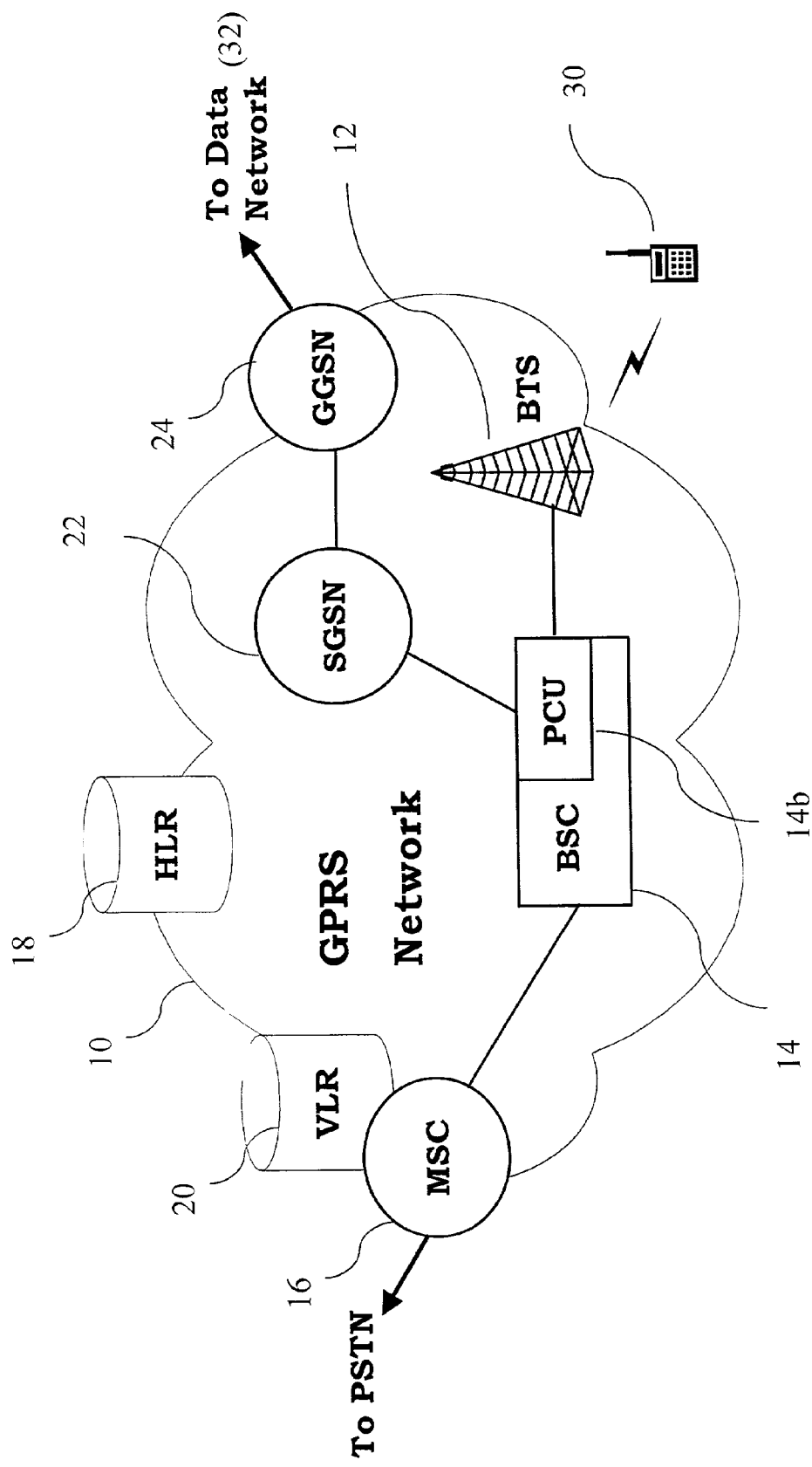
FIG. 1 is a block diagram illustrating the main structure of a known GPRS network.

Major terms used in the detailed description of the present invention are provided below:

| | |
|---|---|
| AMPS | Advanced Mobile Phone System |
| ARQ | Admission Request |
| BSC | Base Station Controller |
| BTS | Base Transceiver Station |
| DCFs | Disengage Confirmations |
| DRQs | Disengage Requests |
| GGSN | Gateway GPRS Support Node |
| GK | GateKeeper |
| GPRS | General Packet Radio Service |
| GSM | Global Systems for Mobile communication |
| GTP | GPRS Tunneling Protocol |
| H.323 | An International-Telecommunications-Union ("ITU") standard for realtime, interactive voice and videoconferencing over Local Area Networks ("LANs") and the Internet. Widely used for IP telephony, it allows any combination of voice, video and data to be transported. |
| H.225 | a call signaling scheme that is used to set up connections between two points, such as terminals and gateways, over which the real-time data can be transported. |
| HLR | Home Location Register |
| IS-136 | Interim Standard-136: It is a North American digital mobile telephony standard based on TDMA technology. It is a TDMA specification that is used to create in a fully digital second generation system and is backward compatible with analog AMPS. |
| IMSI | International Mobile Subscriber Identity |
| IP | Internet Protocol |
| ISDN | Integrated Service Digital Network |
| ISUP | Integrated-service-digital-network User Part |
| MM | Mobility Management |
| MSC | Mobile Switching Center |
| PCU | Packet Control Unit |
| PDN | Packet Data Network |
| PDP | Packet Data Protocol |
| PSDN | Public Switched Data Network |
| PSTN | Public Switched Telephone Network |
| QoS | Quality of Service |
| RAS | Registration, Admission and Status |
| SGSN | Serving GPRS Support Node |
| SS7 | Common Channel Signaling System #7: It is a global telecommunications standard for the signaling system that allows the various components of a telephone network to exchange information and connect calls. |
| TCP/IP | Transmission Control Protocol/Internet Protocol |
| TDMA | Time-Division-Multiple-Access |
| TMSI | Temporary Mobile Subscriber Identity |
| VLR | Visitor Location Registor |
| VMSC | Voice-over-Internet-Protocol Mobile Switching Center |
| VoIP | Voice over Internet Protocol |

The present invention provides systems and methods of providing voice communications for radio networks. Preferably, the systems and methods of the present invention provide VoIP service for a radio network, such as a General Packet Radio Service ("GPRS") network, that communicates between a wireless communication device and an end terminal in a Packet Data Network ("PDN").

The systems and methods of the present invention provide a Voice-over-Internet-Protocol Mobile Switching Center ("VMSC") that communicates with the wireless communication device through a circuit-switched network and communicates with the packet data network with a packet-switched network. In the embodiments for implementing the present invention in a GPRS network, the VMSC in the present invention transforms voice signals from a circuit-switched network, such as a Global-Systems-for-Mobile-Communication ("GSM") network, to voice packets for a packet-switched network, such as a GPRS network. The systems and methods of the present invention may operate under the standard H.323, GPRS, and GSM protocol and erase the need of modifying the operation of a traditional packet-switched GPRS and H.323 networks. The systems and methods for providing VoIP service in the present invention enable standard GSM and GPRS mobile phones to receive VoIP service and eliminate the need for equipping mobile phones with H.323 communicating capability.

Systems for Providing Voice Communications

Figure 2:
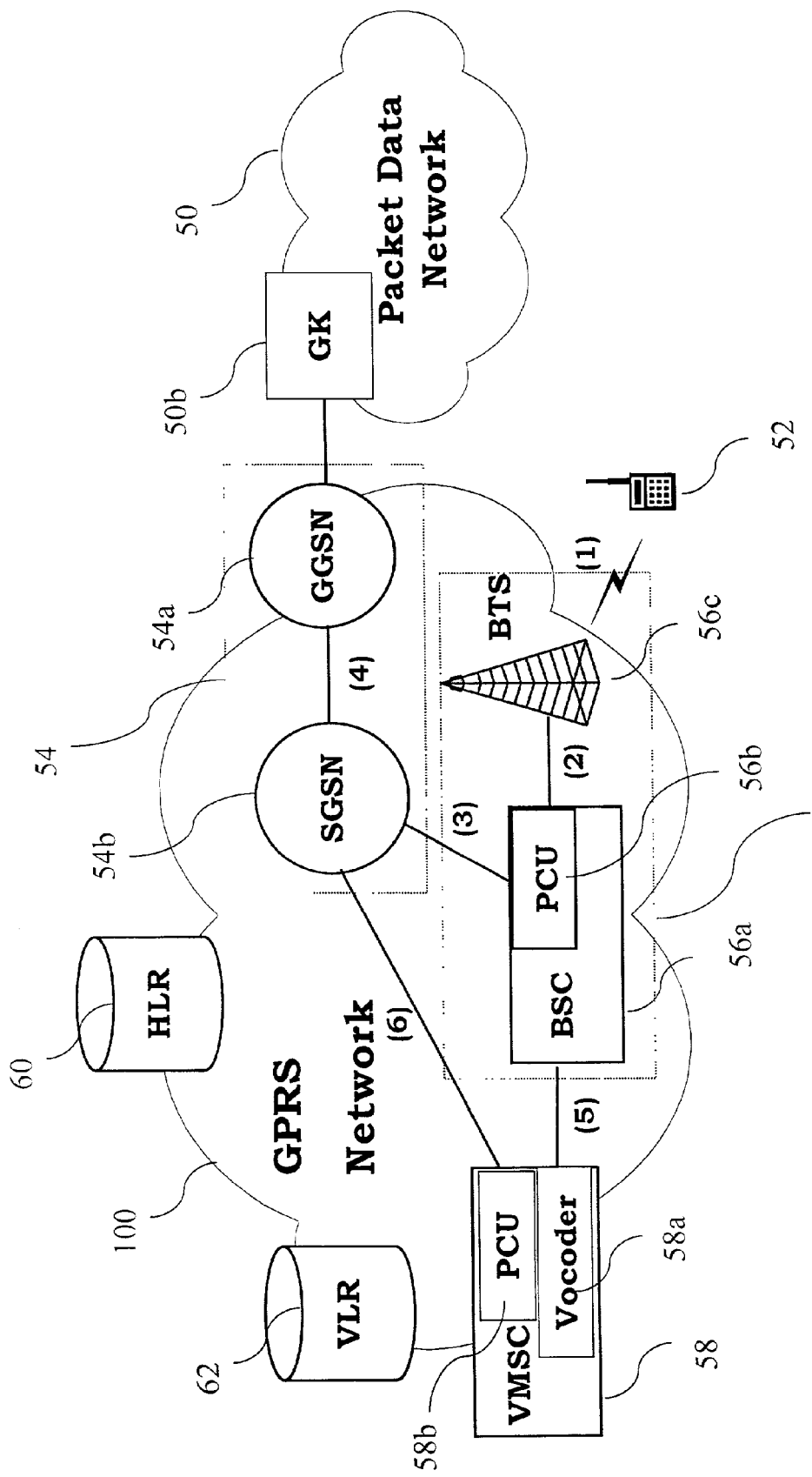
FIG. 2 a block diagram illustrating one embodiment of the system of the present invention for providing voice communications between a wireless communication device and an end terminal in a packet data network.

FIG. 2 is a block diagram illustrating one embodiment of the system of the present invention for providing voice communications between a packet data network 50 and a wireless communication device 52. As an example, packet data network 50 may be a Public Switched Data Network ("PSDN"), such as the Internet or a network that implements H.323 standard; wireless communication device 52 may be a mobile phone. In one embodiment, a network 100 communicating between packet data network 50 and wireless communication device 52 may be a radio network implementing General Packet Radio Service.

The system of the present invention includes a packet communication supporting subsystem 54, a base station subsystem 56, and a VMSC 58. Packet communication supporting subsystem 54 communicates with the packet data network 50, base station subsystem 56, and VMSC 58. In general, packet communication supporting subsystem 54 also operates to locate the wireless communication device 52 by communicating with other databases in network 100. In one embodiment implementing GPRS, packet communication supporting subsystem 54 includes a Gateway GPRS Support Node ("GGSN") 54a and a Serving GPRS Support Node ("SGSN") 54b. GGSN 54a communicates with packet data network 50 and SGSN 54b communicates with GGSN 54a and VMSC 58.

Network 100 may also include two databases, a Home Location Register ("HLR") 60 and a Visitor Location Registor ("VLR") 62, which are traditional elements in a GSM network. In one embodiment implementing a GPRS and GSM network, GGSN 54a and SGSN 54b communicates with HLR 60 and VLR 62 to locate wireless communication device 52. In addition, the system of the present invention may include a GateKeeper ("GK") 50b in packet data network 50, which operates as a gatekeeper for a H.323 network in part to transform Internet-Protocol ("IP") addresses. Therefore, GGSN 54a may communicate with packet data network 50 through GK 50b, as illustrated in FIG. 2.

Base station subsystem 56 communicates with wireless communication device 52 and packet communication supporting subsystem 54, or more specifically, SGSN 54b for an embodiment implementing GPRS. Packet communication supporting subsystem 54 communicates data packets between base station subsystem 56 and packet data network 50. In one embodiment, base station subsystem 56 includes a Base Station Controller ("BSC") 56a and a Base Transceiver Station ("BTS") 56c. BSC 56a communicates with packet communication supporting subsystem 54 through a base station Packet Control Unit ("PCU") 56b; BTS 56c communicates with wireless communication device 52 by radio communication.

VMSC 58 communicates with packet communication supporting subsystem 54 through a packet-switched network, such as a GPRS network, and communicates with base station subsystem 56 through a circuit-switched network, such as a GSM network. More specifically, VMSC 58 receives voice signals from base station subsystem 56 and then generates and transmits voice packets to packet communication supporting subsystem 54. VMSC 58 also receives voice packets from packet communication supporting subsystem 54 and transmits voice signals to base station subsystem 56. The voice packets are transmittable through a GPRS network. In one embodiment, VMSC 58 includes a vocoder 58a and a Packet Control Unit ("PCU") 58b communicating with the vocoder 58a. Further, vocoder 58a communicates through a circuit-switched network to receive voice signals from, or submit voice signals to, the base station subsystem 56, and PCU 58b communicates through a packet-switched network to receive voice packets from, or submit voice packets to, the packet communication supporting subsystem 54. Therefore, vocoder 58a and PCU 58b operate together to process at least two forms of voice information, voice signals and voice packets. More specifically, vocoder 58a compresses a digitized data stream into compressed data and PCU 58b outputs the voice information in packet form; PCU 58b also receives voice information in packet forms and vocoder 58a decompresses the compressed data into a digitized data stream. In one embodiment of the present invention, the vocoder 58a may employ a high-speed digital signal processor with supporting memory devices.

Therefore, as illustrated by FIG. 2, in one embodiment of implementing GPRS and GSM, the system of the present invention, which operates between wireless communication device 52 and packet data network 50, may include BTS 56c, BSC 56a, VMSC 58, SGSN 54b, GGSN 54a, and GK 50b. VMSC 58 communicates with SGSN 54b with a Gb interface in GPRS network, in the form of voice packets, or more specifically, VoIP packets or GPRS packets. As a result, wireless communication device 52 communicates ordinary non-voice packets with packet data network 50 through the path of (1)⇌(2)⇌(3)⇌(4) as shown in FIG. 2, which includes BTS 56c, BSC56a, SGSN 54b, and GGSN54a. In contrast, wireless communication device 52 communicates with packet data network 50, for the purpose of providing VoIP services, through the path of (1)⇌(2)⇌(5)⇌(6)⇌(4), as shown in FIG. 2, which includes BTS 56c, BSC56a, VMSC58, SGSN 54b, and GGSN54a. For VoIP services, the communications through path (6) and path (4), or the communicating paths between VMSC 58 and SGSN 54b and between SGSN 54b and GGSN 54a, are in a voice-data packet form. Path (1)⇌(2)⇌(5), which includes the communicating paths between wireless communication device 52 and BTS 56a and between BSC 56a and VMSC 58, is a circuit-switched path that communicates in the same way as an ordinary GSM network. Under the system of the present invention, standard GSM and GPRS mobile phones are able to make and receive VoIP calls in the same way as making and receiving ordinary phone calls.

Figure 3:
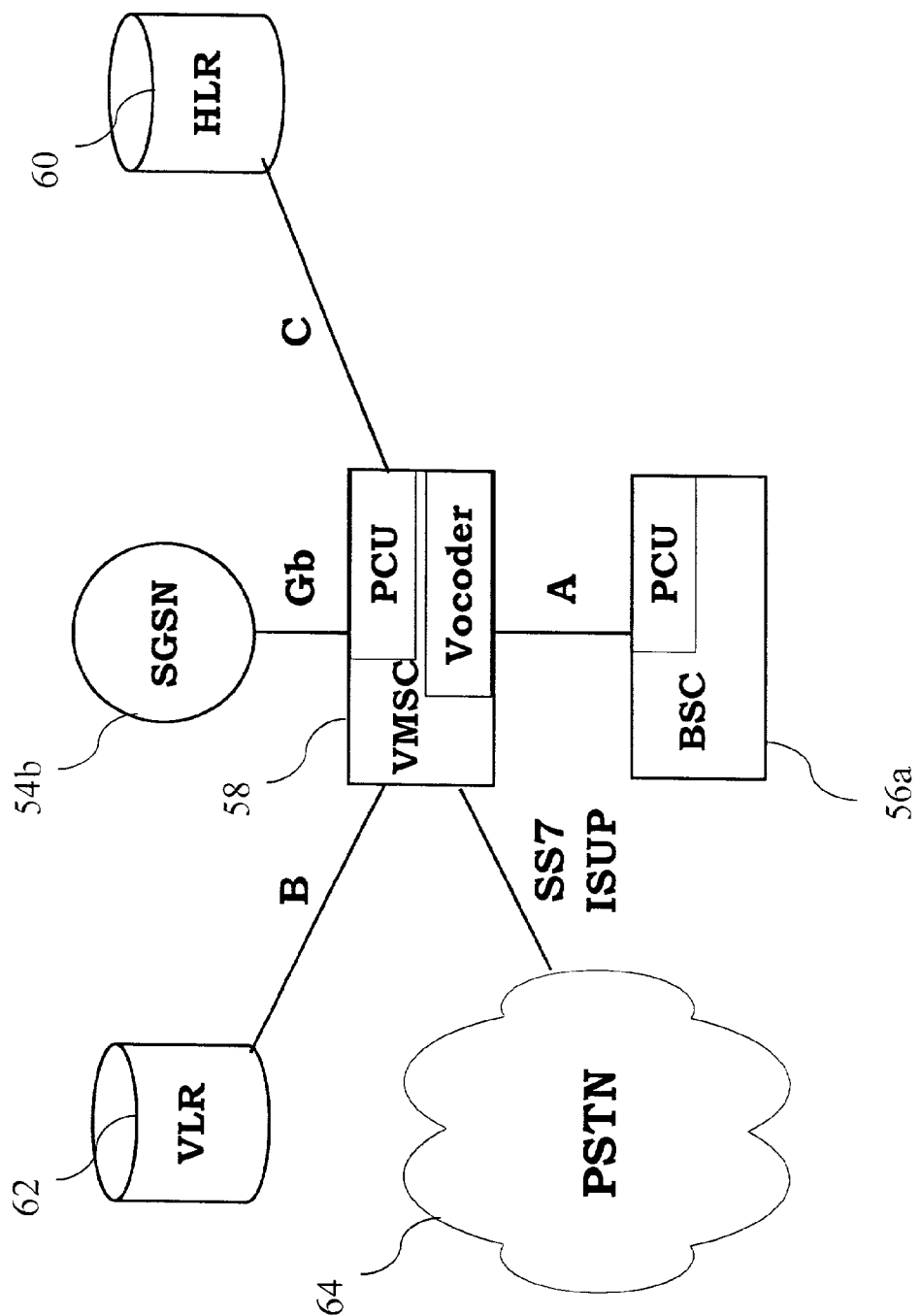
FIG. 3 a block diagram illustrating one embodiment of the present invention of the interfaces between a VMSC and other elements in a GSM/GPRS network.

In one embodiment of the present invention, VMSC 58 may be used to replace a Mobile Switching Center ("MSC") in a GSM network. VMSC 58 operates as a softswitch having the function of a router and is therefore simpler than a traditional MSC. FIG. 3 is a block diagram illustrating the interfaces between VMSC 58 and other elements in a GSM/GPRS network in the present invention. VMSC 58 employs the same signal interface as an ordinary MSC, which means VMSC 58 communicates with BSC 56a, VLR 62, and a Publicly Switched Telephone Network ("PSTN") 64 respectively through interface A, interface B, and the Integrated-Service-Digital-Network User Part ("ISUP") of Signaling System No.7 ("SS7"). VMSC 58, however, communicates with SGSN 54b through a Gb interface of a GPRS network. A traditional MSC communicates voice signals of ordinary phone calls through a circuit-switched network, such as a telephone trunk. In contrast, VMSC 58 communicates VoIP packets through a packet-switched network, such as a GPRS network.

As an illustration of one embodiment of the present invention, each mobile phone that submits voice signals through VMSC 58 will be given an IP address. In a GPRS network, the IP address of a mobile phone can be assigned statically or dynamically. A standard GSM mobile phone, however, cannot be assigned with an IP address. Therefore, for the implementation of the present invention in a GPRS network, VMSC 58 operates to assign an IP address through a GPRS Packet-Data-Protocol ("PDP") Context Activation process.

In one embodiment, VMSC 58 contains a mobile phone table that stores information related to each mobile phone, such as MM and PDP context information, which includes Temporary Mobile Subscriber Identity ("TMSI"), International Mobile Subscriber Identity ("IMSI"), and certain Quality-of-Service ("QoS") related information. This kind of information is basically similar to what is stored on each mobile phone. In one embodiment, the system of the present invention employs H.323 protocol to transmits voice information and VMSC 58 therefore functions in part as a H.323 terminal.

Figure 4:
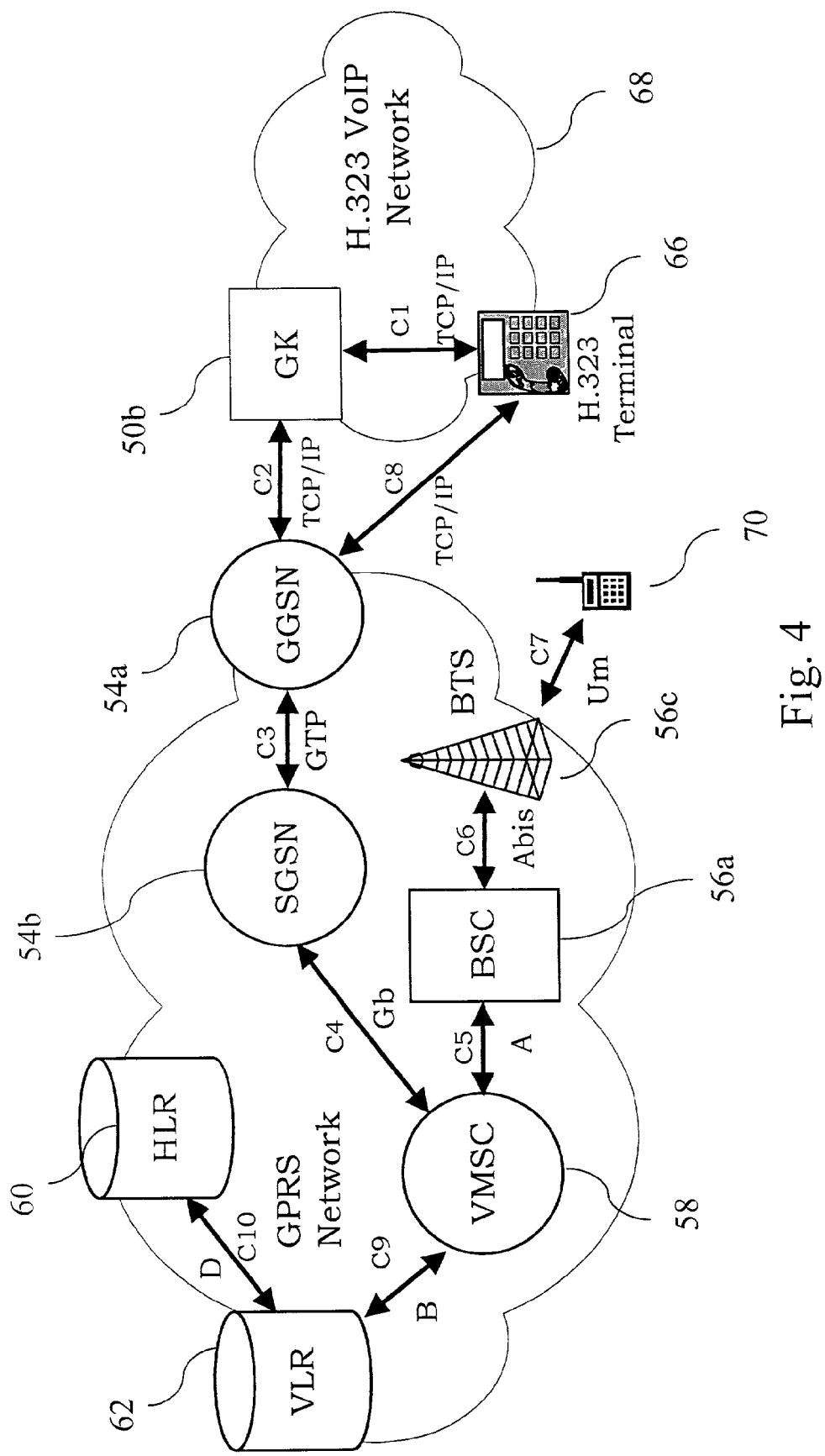
FIG. 4 a block diagram illustrating the communication between a H.323 terminal and a GSM mobile phone in one embodiment of the present invention.

FIG. 4 is a block diagram illustrating the communication between a H.323 terminal 66 in a VoIP network 68 and a GSM mobile phone 70 in one embodiment of the present invention. As illustrated in the diagram, the system of this embodiment includes several communication channels: C1 between H.323 terminal 66 and GK 50b, C2 between GK 50b and GGSN 54a, C3 between GGSN 54a and SGSN 54b, C4 between SGSN 54b and VMSC 58, C5 between VMSC 58 and BSC 56a, C6 between BSC 56a and BTS 56c, C7 between BTS 56c and GSM mobile phone 70, C8 between H.323 terminal 66 and GGSN 54a, C9 between VMSC 58 and VLR 62, and C10 between VLR 62 and HLR 60. Communication channels C1, C2, and C8 employ Transmission Control Protocol/Internet Protocol ("TCP/IP"); communication channels C3 and C4 respectively employ GPRS tunneling Protocol ("GTP") and Gb Protocol; communication channels C5, C6, C7, C9, and C10 employ standard GSM protocol. More specifically, H.323 protocol, which is a TCP/IP-based protocol, is employed in communications between VMSC 58 and a H.323 network 68 and H.323 protocol is based on TCP/IP.

Registration Methods

Figure 5:
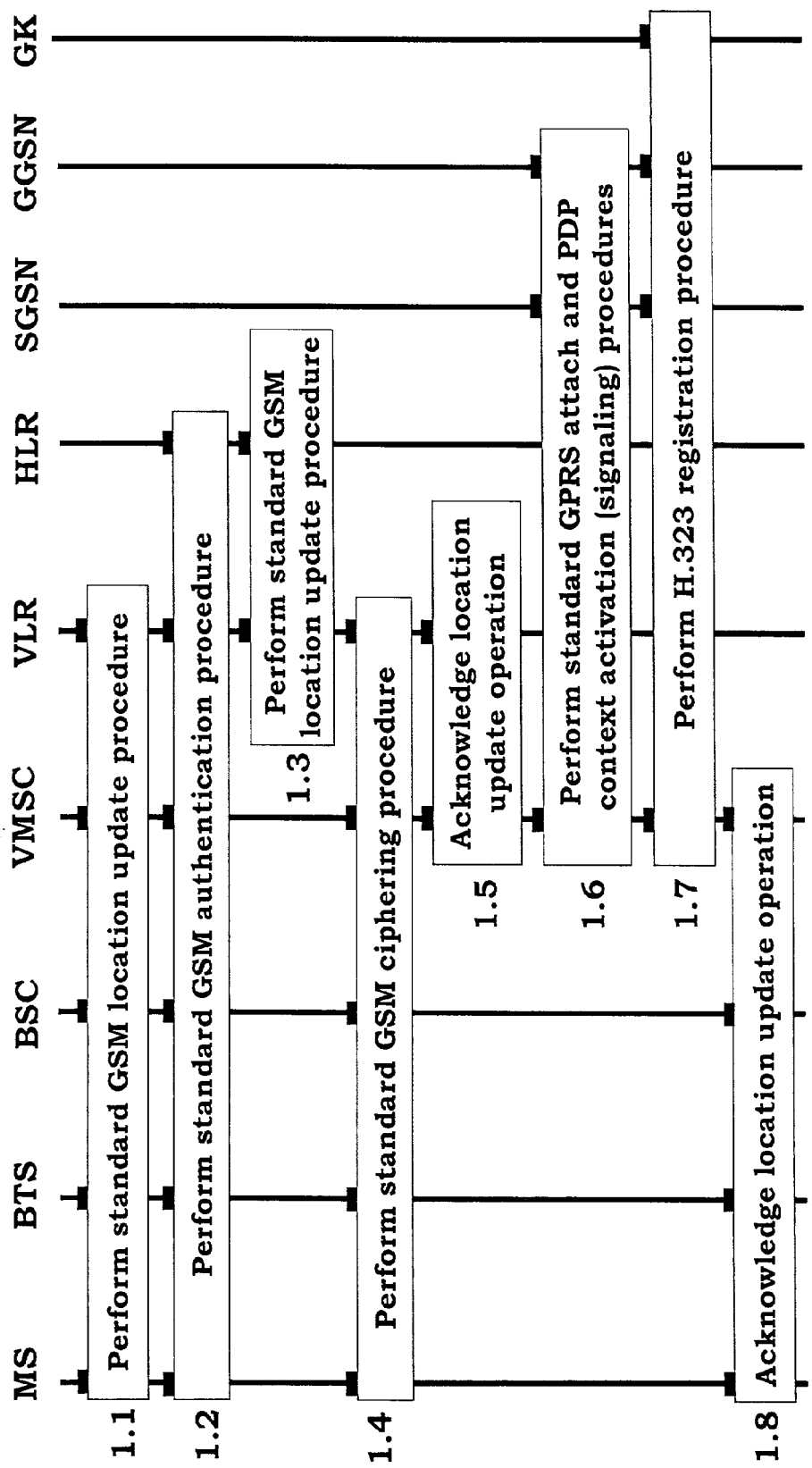
FIG. 5 is a general flow diagram for implementing one embodiment of the registration methods of the present invention.

The present invention also provides registration methods for providing voice communications between a wireless communication device and an end terminal in a packet data network. FIG. 5 is a general flow diagram for implementing one embodiment of the registration methods of the present invention. The diagram also illustrates the network elements that are involved in each step. Once a wireless communication device, such as a mobile phone, is turned on, a location update procedure of the wireless communication device is performed at step 1.1. In one embodiment implementing GPRS and GSM, a standard GSM location update procedure is performed. The identity of the wireless communication device is then authenticated in step 1.2, for example, by a standard GSM authentication procedure. For a network system including two databases of a VLR and a HLR, the location update procedure in step 1.1 further includes a sub-step of performing another standard GSM location procedure wherein the VLR notifies location update information of a mobile phone to the HLR, and, upon receiving the location update information, the HLR submits the ordering information regarding the mobile phone to the VLR at step 1.3.

After the location update and authentication procedures, a ciphering procedure for the wireless communication device, such as a standard GSM ciphering procedure, is then performed at step 1.4. A VMSC is then notified of the registration of the wireless communication device, preferably including the completion of the location update operation, at step 1.5. In this embodiment, the VMSC communicates with the wireless communication device through a circuit-switched network and communicates with the end terminal through a packet-switched network. After acknowledging the registration by the VMSC, communication between the VMSC and the packet data network is activated at step 1.6. In one embodiment implementing GPRS, the activation procedure involves several steps of standard GPRS attach and PDP context activation. First, the VMSC initiates a GPRS attach with a SGSN. According to a GPRS PDP Context Activation procedure, the VMSC, on behalf of a GPRS mobile phone, then initiates a new PDP context. During the initiation, a GGSN employs the IMSI of a mobile phone to obtain some information in a HLR, such as an IP address, which may be a dynamic one. The GGSN further establishes a record for the mobile phone, including information such as IMSI, IP address, QoS information, and SGSN address. At this moment, an IP session of the VMSC has been established and the VMSC therefore is able to communicate in Internet Protocol with an external H.323 network, preferably through a gatekeeper.

After activation step 1.6, the registration of the wireless communication device to the packet data network is performed at step 1.7. In one particular embodiment using a H.323 packet data network, H.323 registration is performed. For H.323 registration, the VMSC initiates H.323 registration and notifies the GK in the H.323 network of the corresponding information of an alias address to a transport address. Upon receiving the registration request of a mobile phone, the GK creates a record regarding the mobile phone that contains the corresponding information of a mobile phone number to an IP address. The GK then notifies the VMSC of the completion of H.323 registration. Upon receiving the notification, the VMSC establishes MM and PDP context and stores the context in the mobile phone record of the VMSC. The VMSC notifies the wireless communication device of a location update operation at step 1.8. In one embodiment, the VMSC notifies a mobile phone that a location update request has been accepted. Registration is therefore completed.

Call-Making Methods

Figure 6:
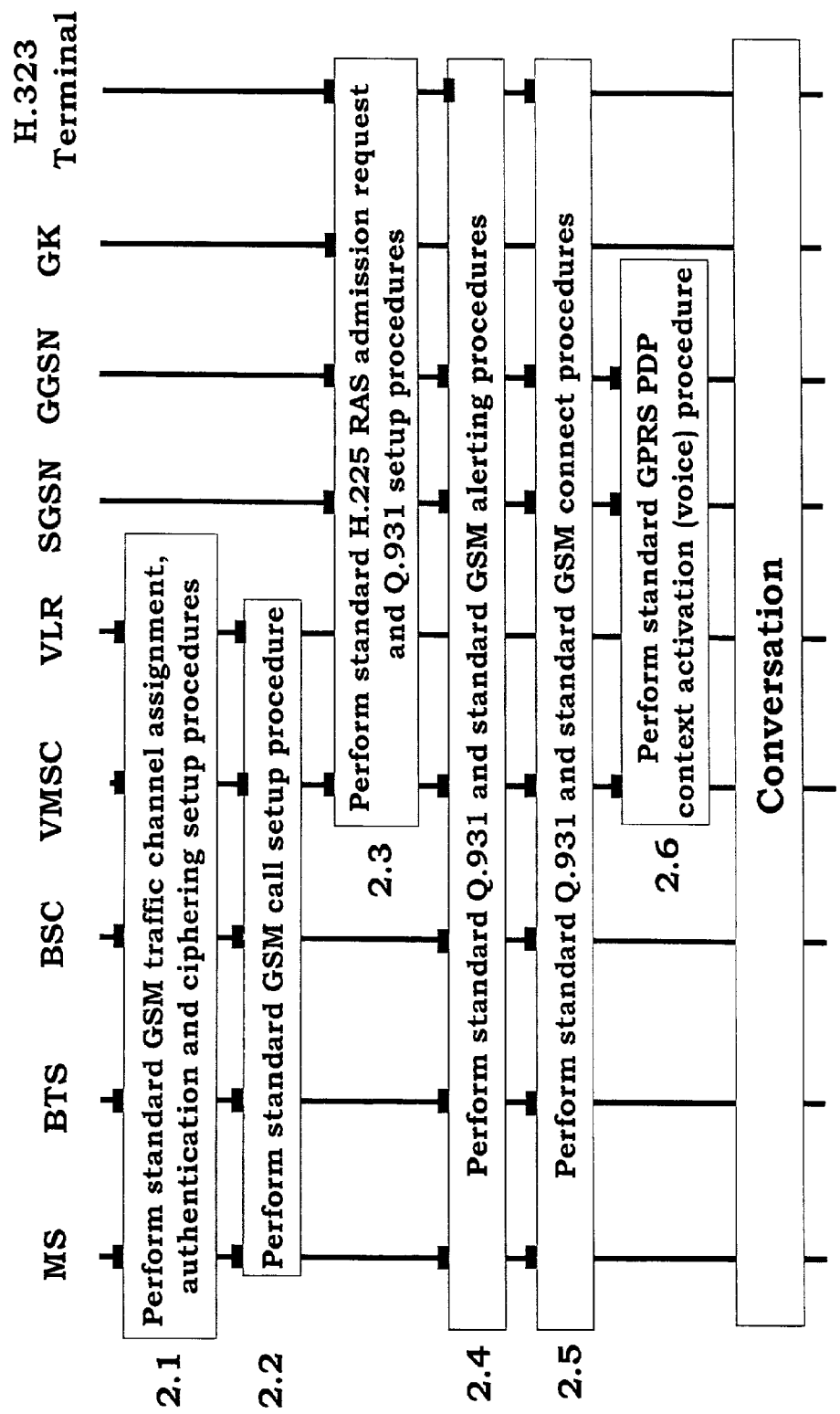
FIG. 6 is a general flow diagram for implementing one embodiment of the call-making methods of the present invention.

The present invention also provides call-making methods for a wireless communication device to activate its voice communications with an end terminal in a packet data network. FIG. 6 is a general flow diagram for implementing one embodiment of the call-making methods of the present invention. The diagram also illustrates the network elements that are involved in each step. Channel assignment, authentication, and ciphering setup procedures for the wireless communication device, such as a mobile phone, are performed at step 2.1. A call setup procedure for the wireless communication device, such as a standard GSM call setup procedure, is then performed at step 2.2. In one embodiment implementing GPRS and GSM, the mobile phone, through a dialing request, sends a "Um-Setup" signal to a BSC. The BSC then sends the signal to a VMSC, preferably through GSM Abis interface and A interface. In another embodiments of the present invention, the dialing request and its content are sent to the VMSC and VMSC inquires a VLR to confirm if the requested service of making a phone call is permissible for a particular mobile phone. Upon receiving confirmation of allowance from the VLR, the VMSC checks the PDP context record and determines the routing path of packages according to the GPRS Tunnel ID and GGSN number of the mobile phone.

A voice communication channel is established between the VMSC and the packet data network at step 2.3. The VMSC in the present invention communicates with the wireless communication device through a circuit-switched network and communicates with the end terminal through a packet-switched network. One embodiment of the present invention employs standard H.225 Registration, Admission and Status ("RAS") admission request procedure through which a GK provided the VMSC with the IP address of the end terminal. As an illustrative example, the signal may be transmitted through a path of C4⇆C3⇆C2 as shown in FIG. 4. Upon receiving a responding signal from the GK, the VMSC communicates with the end terminal through the GGSN to exchange Q.931 setup and call-proceeding signals between the VMSC and the end terminal in order to establish a voice-communication channel. The block diagram in FIG. 4 illustrates one embodiment of the voice-communication channel that provides a signal path C4⇌C3⇌C8 for the communication between VMSC 58 and a H.323 terminal 66. The terminal may further transmit RAS Admission Request ("ARQ") signals to GK 50b and request communications, following path C1 as shown in FIG. 4.

Once the voice communication channel is established between the VMSC and the packet data network at step 2.3, the end terminal in the packet data network and the wireless communication device, such as a mobile phone are alerted at step 2.4. In one embodiment, when a communication request of the end terminal, such as a H.323 terminal, is accepted by the GK, the end terminal itself generates alerting sounds and notifies the mobile phone through standard Q.931 alerting and GSM alerting signals. Upon receiving the alerting signals, the mobile phone generates alerting sounds. The end terminal and the wireless communication device are therefore connected through the VMSC at step 2.5. Preferably, the H.323 receiving terminal generates a Q.931 connect signal and transmits it to the VMSC; the VMSC sends the signal to the mobile phone sequentially through GSM-A, Abis, and Um interfaces, as shown in FIG. 4, respectively for channels C5, C6, and C7. In one embodiment, the VMSC initiates a PDP context for the mobile phone for voice communications by performing standard GPRS PDP context activation procedure at step 2.6. A PDP context activation procedure is performed to create a voice PDP context. The users of the mobile phone and the H.323 terminal are able to proceed with their conversation through the communication of the VMSC, as illustrated in FIG. 6.

Call-Releasing Methods

Figure 7:
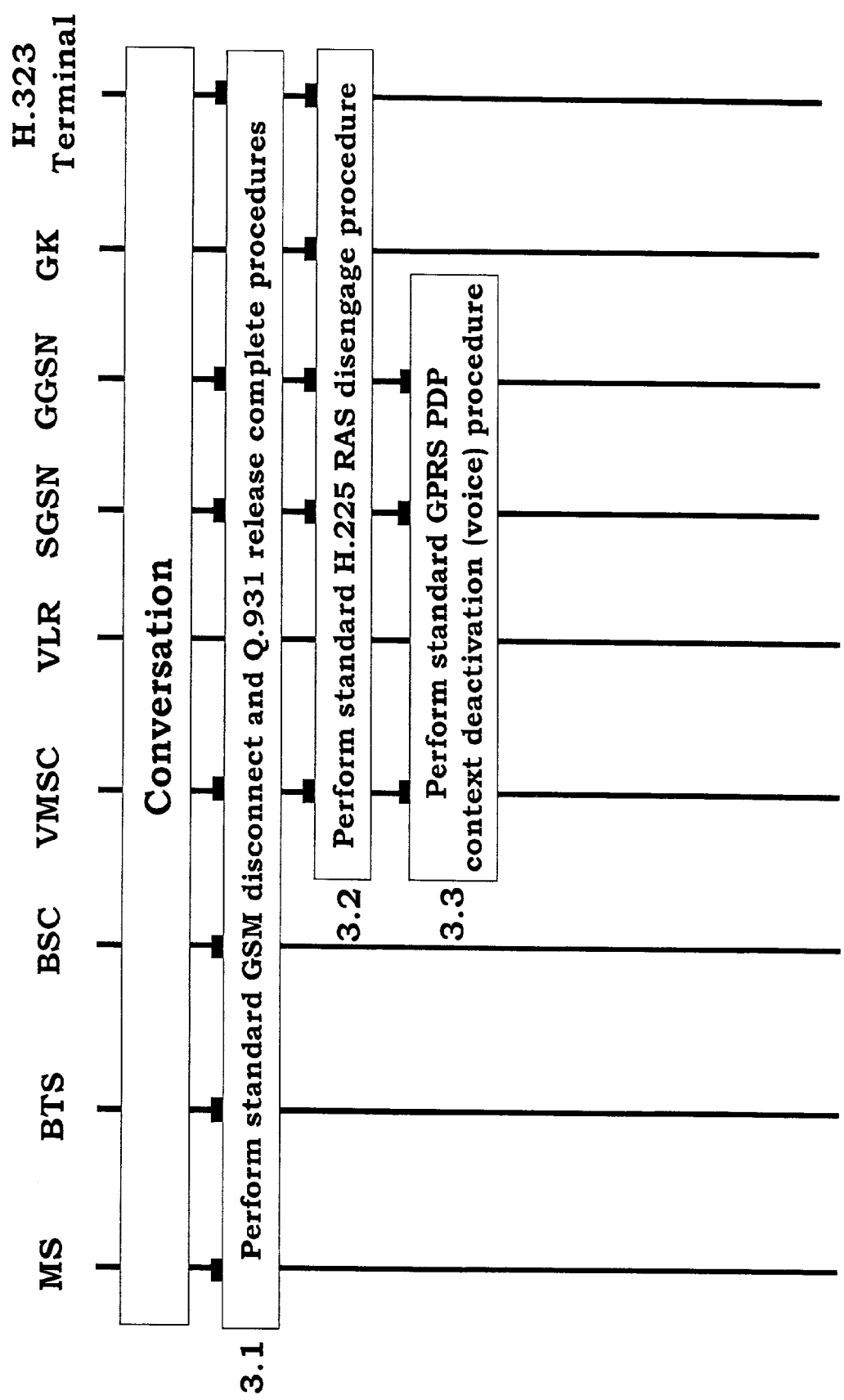
FIG. 7 is a general flow diagram for implementing one embodiment of the call-releasing methods of the present invention.

The present invention further provides call-releasing methods for terminating voice communications between a wireless communication device and an end terminal in a packet data network. FIG. 7 is a general flow diagram for implementing one embodiment of the call-releasing methods of the present invention. The diagram also illustrates the network elements that are involved in each step. Disconnecting and release procedures are performed at step 3.1. In one embodiment, the voice communications provided between the wireless communication device, such as a mobile phone, and the end terminal, such as a H.323 terminal, are disconnected by the mobile phone. When a user finish conversation by "hanging up" the mobile phone, the mobile phone sends a disconnecting signal. The disconnecting signal was transmitted to a VMSC, usually through a BTS and a BSC. The VMSC in the present invention communicates with the wireless communication device through a circuit-switched network and communicates with the end terminal through a packet-switched network. The VMSC then sends a release signal. In one embodiment applying the present invention to voice communications between a mobile phone in a GPRS network and a H.323 terminal, the VMSC sends a Q.931 release complete signal to the H.323 terminal in order to terminate the conversation.

A disengage request procedure is performed at step 3.2, preferably by exchanging disengage requests between the VMSC and the end terminal. In one embodiment, both the VMSC and the H.323 terminal exchange RAS Disengage Requests ("DRQs") and RAS Disengage Confirmations ("DCFs") with a GK to notify the GK that the conversation has been terminated. The GK then obtains necessary records regarding this particular phone call for determining appropriate service charges. Finally, a deactivation procedure is performed as step 3.3. In one of the preferred embodiments of the present invention, a standard GPRS PDP context deactivation procedure is performed to deactivate the voice PDP context.

Call-Receiving Methods

Figure 8:
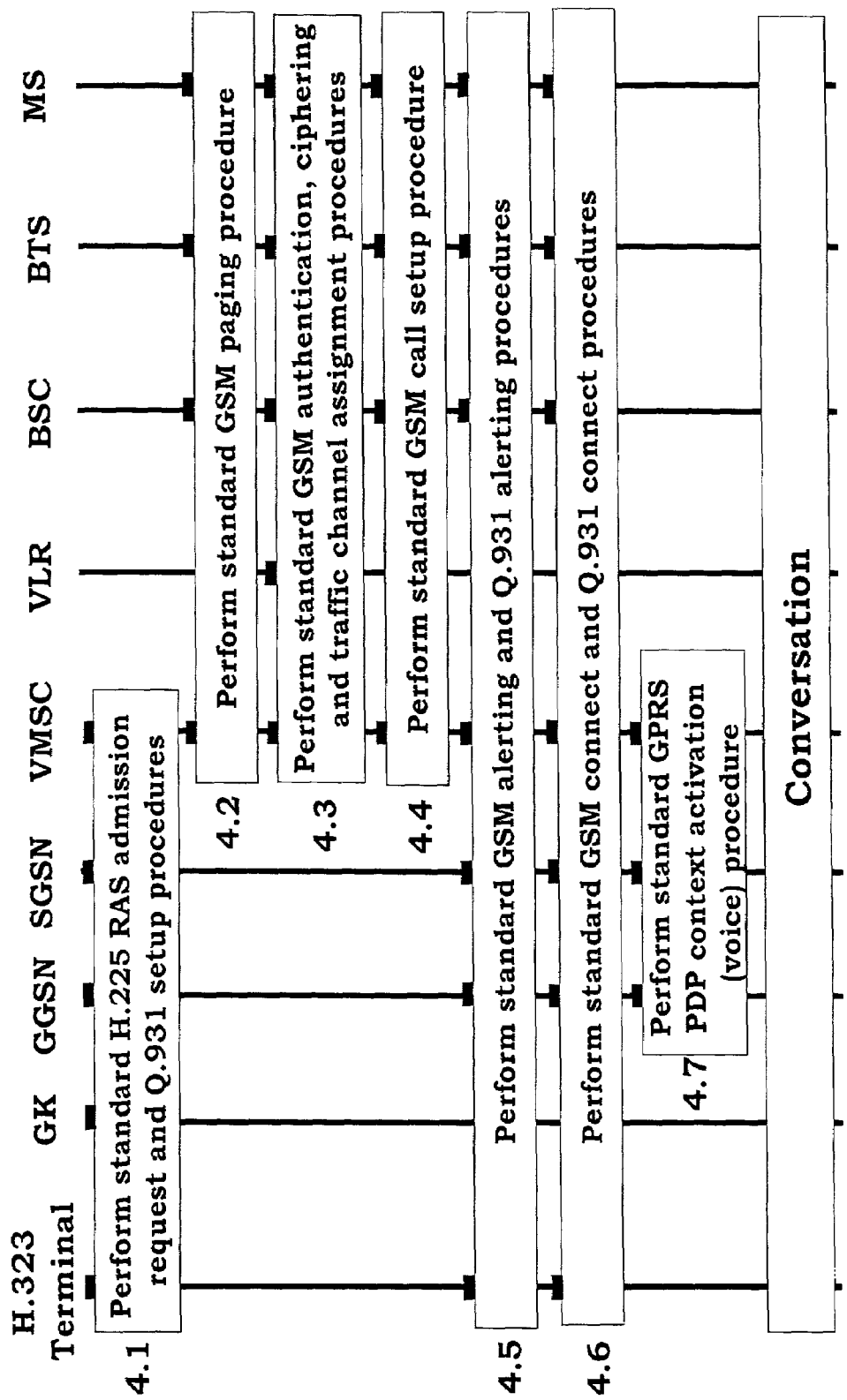
FIG. 8 is a general flow diagram for implementing one embodiment of the call-receiving methods of the present invention.

Additionally, the present invention provides call-receiving methods for a wireless communication device to receive voice communications initiated by an end terminal in a packet data network. FIG. 8 is a general flow diagram for implementing one embodiment of the call-receiving method of the present invention. The diagram also illustrates the network elements involved in each step. A voice communication channel is established between a VMSC and the end terminal at step 4.1.

In one embodiment, standard H.225 RAS admission request and Q.931 setup procedures are performed. The end terminal, such as a H.323 terminal, transmits a H.225 RAS admission request signal to a GK of the packet data network, which contains the identity of the wireless communication device, such as the phone number of a mobile phone. The GK is able to find the corresponding IP address according to an IP transformation table and responds to the H.323 terminal with an H.225 RAS admission confirmation signal. The H.323 terminal sends, preferably through a GGSN, a Q.931 setup signal to a VMSC in order to establish a voice communication channel. The VMSC in the present invention communicates with the wireless communication device through a circuit-switched network and communicates with the end terminal through a packet-switched network. Upon receiving a setup signal, the GGSN obtains the PDP context of the identified wireless communication device, such as a mobile phone, according to the IP address identified by a packet received from the H.323 terminal. The GGSN then obtains the GPRS Tunnel ID and SGSN address of the mobile phone from the PDP context and sends the packet to the VMSC. Upon receiving the Q.931 signal, the VMSC responds to the H.323 terminal with a Q.931 call proceeding signal. The VMSC and GK exchange RAS ARQ and Admission Confirmation ("ACF") signals with each other. The VMSC then sends a communication request, in a similar way as illustrated for step 2.3, as shown in FIG. 6.

After the voice communication channel is established at step 4.1, the VMSC pages the wireless communication device at step 4.2, for example, by performing a standard GSM paging procedure. Upon receiving a response from the wireless communication device by the VMSC, channel assignment, authentication, and ciphering setup procedures for the wireless communication device are performed at step 4.3. In one embodiment implementing GSM and GPRS, the VMSC and a VLR in a GSM/GPRS network operate together to perform standard GSM channel assignment, authentication, and ciphering setup procedures. A call setup procedure for the wireless communication device is performed at step 4.4. In one embodiment, the VMSC performs a standard GSM call setup procedure by transmitting a setup signal to the wireless communication device, such as a mobile phone, preferably through a BSC and BTS.

The wireless communication device and the end terminal are both alerted at step 4.4. In one embodiment, the mobile phone generates an alerting sound and sends an alerting signal to VMSC. The VMSC sends the alerting signal to the H.323 terminal and triggers the H.323 terminal to alert. The end terminal and the wireless communication device are then connected through the VMSC at step 4.6. As an example of the connecting procedure, the user of a mobile phone picks up this particular calling request and the mobile phone sends a connecting signal to the VMSC. Upon receiving the connecting signal, the VMSC transmits a Q.931 connecting signal to the H.323 terminal. Finally, voice communications for the wireless communication device are activated by the VMSC at step 4.7. In one embodiment, the VMSC initiates a voice-communicating PDP context for the wireless communication device upon receiving the connecting signal in order to provide voice communications. The users of the mobile phone and the H.323 terminal are able to proceed with their conversation through the communication of the VMSC, as illustrated in FIG. 8.

The systems and methods of the present invention provide VoIP service for radio networks by a VMSC that communicates between a circuit-switched network and a packet-switched network. The VMSC transforms between voice signals from and to a circuit-switched network and voice packets to and from a packet-switched network. Therefore, in one embodiment of the present invention, the systems and methods may operate under the standard H.323, GPRS, and GSM protocols without modifying the operation of traditional packet-switched GPRS and H.323 networks. In this particular embodiment, standard GSM and GPRS mobile phones without H.323 communicating capabilities, are able to receive VoIP service by implementing the systems or methods of the present invention.

It will be apparent to those skilled in the art that various modifications and variations can be made in the disclosed systems and methods without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A registration method for providing voice communications between a wireless communication device and an end terminal in a packet data network, comprising:
   performing a location update of the wireless communication device;
   authenticating the identity of the wireless communication device;
   performing a ciphering procedure for the wireless communication device;
   notifying a Voice-over-Internet-Protocol Mobile Switching Center ("VMSC") of the registration of the wireless communication device, the VMSC communicating with the wireless communication device through a circuit-switched network and communicating with the end terminal through a packet-switched network;
   activating a communication between the VMSC and the packet data network;
   performing a registration of the wireless communication device to the packet data network; and
   notifying the wireless communication device of the completion of location update,
   wherein an activation of the communication between the VMSC and the packet data network comprises:
      initiating a new Packet Data Protocol ("PDP") context by the VMSC;
      establishing a record for the wireless communication device by a Gateway General Packet Radio Service ("GPRS") Support Node ("GGSN"), the GGSN communicating with the packet data network through a gatekeeper ("GK") and with the VMSC through a supporting Serving GPRS Support Node ("SGSN"); and
      enabling an Internet-Protocol communication between the GK and the VMSC.

2. The registration method as claimed in claim 1, wherein the wireless communication device is a mobile phone and the end terminal is a H.323 terminal.

3. A registration method for providing voice communications between a wireless communication device and an end terminal in a packet data network, comprising:
   performing a location update of the wireless communication device;
   authenticating the identity of the wireless communication device;
   performing a ciphering procedure for the wireless communication device;
   notifying a Voice-over-Internet-Protocol Mobile Switching Center ("VMSC") of the registration of the wireless communication device, the VMSC communicating with the wireless communication device through a circuit-switched network and communicating with the end terminal throuah a packet-switched network;
   activating a communication between the VMSC and the packet data network;
   performing a registration of the wireless communication device to the packet data network; and
   notifying the wireless communication device of the completion of location update,
   wherein the registration of the wireless communication device to the packet data network comprises:
      initiating the registration and notifying a gatekeeper ("GK") of the packet data network, by the VMSC, with an alias address and a transport address;
      creating a record by the GK for the mobile phone containing corresponding information of a mobile phone number to an IP address;
      notifying the VMSC of the completion of the registration by the GK; and
      establishing Mobility Management and a Packet Data Protocol context by the VMSC and storing the context in a mobile phone record of the VMSC.

4. A registration method for providing Voice-over-Internet-Protocol service between a H.323 terminal in a packet data network and a mobile phone in a network implementing General Packet Radio Service ("GPRS"), comprising:
   performing a location update of the mobile phone;
   authenticating the identity of the mobile phone;
   performing a ciphering procedure for the mobile phone;
   notifying a Voice-over-Internet-Protocol Mobile Switching Center ("VMSC") of the registration of the mobile phone, the VMSC communicating with the mobile phone through a circuit-switched network and with the H.323 terminal through a packet-switched network;
   activating a communication between the VMSC and the packet data network, an activation of the communication comprising:
      initiating a new Packet Data Protocol ("PDP") context by the VMSC;
      establishing a record for the mobile phone by a Gateway GPRS Support Node ("GGSN"), the GGSN communicating with the packet data network through a gatekeeper ("GK") and with the VMSC through a supporting Serving GPRS Support Node ("SGSN"); and
      enabling an Internet-Protocol ("IP") communication between the GK and the VMSC;
   performing a registration of the mobile phone to the packet data network, comprising:

initiating the registration by the VMSC and notifying a gatekeeper ("GK") of the packet data network with an alias address and a transport address by the VMSC;

creating a record by the GK for the mobile phone containing corresponding information of a mobile phone number to an IP address;

notifying the VMSC of the completion of the registration by the GK; and establishing Mobility Management and a PDP context by the VMSC and storing the context in a mobile phone record of the VMSC; and notifying the mobile phone of the completion of location update.

5. A call-making method for a wireless communication device to activate voice communications with an end terminal in a packet data network, comprising:

performing channel assignment, authentication, and ciphering setup procedures for the wireless communication device;

performing a call setup procedure for the wireless communication device;

establishing a voice communication channel between a Voice-over-Internet Protocol Mobile Switching Center ("VMSC") and the packet data network, the VMSC communicating with the wireless communication device through a circuit-switched network and with the end terminal through a packet-switched network;

alerting the end terminal and the wireless communication device;

connecting the end terminal and the wireless communication device through the VMSC; and performing a Packet Data Protocol ("PDP") context activation procedure to create a voice PDP context, wherein the step of establishing the voice communication channel between the VMSC and the packet data network comprises:

providing the Internet-Protocol address of the end terminal to the VMSC by a gatekeeper ("GK") of the packet data network;

communicating with the end terminal by the VMSC to exchange setup and call-proceeding signals between the VMSC and the end terminal; and transmitting Registration, Admission and Status ("RAS") Admission Request ("ARQ") signals to the GK and requesting communications by the end terminal.

6. The call-making method as claimed in claim 5, wherein a network communicating between the packet data network and the wireless communication device implements General Packet Radio Service.

7. The call-making method as claimed in claim 5, wherein the wireless communication device is a mobile phone and the end terminal is a H.323 terminal.

8. A call-making method for a mobile phone in a network implementing General Packet Radio Service to activate Voice- over-Internet-Protocol communications with a H.323 terminal in a packet data network, comprising:

performing channel assignment, authentication, and ciphering setup procedures for the mobile phone;

performing a call setup procedure for the mobile phone;

establishing a voice communication channel between a Voice-over-Internet-Protocol Mobile Switching Center ("VMSC") and the packet data network, comprising:

providing the Internet-Protocol address of the H.323 terminal to the VMSC by a gatekeeper of the packet data network;

communicating with the H.323 terminal by the VMSC to exchange setup and call-proceeding signals between the VMSC and the H.323 terminal; and transmitting Registration, Admission and Status Admission Request signals to the gatekeeper and requesting communications by the end terminal, wherein the VMSC communicates with the mobile phone through a circuit-switched network and with the H.323 terminal through a packet-switched network;

alerting the H.323 terminal and the mobile phone;

connecting the H.323 terminal and the mobile phone through the VMSC; and performing a Packet Data Protocol ("PDP") context activation procedure to create a voice PDP context.

9. A call-receiving method allowing a wireless communication device to receive voice communications initiated by an end terminal in a packet data network, comprising:

establishing a voice communication channel between a Voice-over-Internet-Protocol Mobile Switching Center ("VMSC") and the end terminal, the VMSC communicating with the wireless communication device through a circuit-switched network and with the end terminal through a packet-switched network;

paging the wireless communication device;

performing channel assignment, authentication, and ciphering setup procedures for the wireless communication device upon receiving a response from the wireless communication device;

performing a call setup procedure for the wireless communication device;

alerting the wireless communication device and alerting the end terminal;

connecting the end terminal and the wireless communication device through the VMSC;

performing a Packet Data Protocol ("PDP") context activation procedure to create a voice PDP context; and activating voice communications for the wireless communication device by the VMSC, wherein establishing the voice communication channel comprises:

performing Registration, Admission and Status ("RAS"), Admission Request ("ARQ") and setup procedures, wherein the end terminal transmits a RAS admission request signal to a gatekeeper of the packet data network, which contains the identity of the wireless communication device, and the gatekeeper responds to the end terminal with a RAS admission confirmation signal;

sending a setup signal to the VMSC by the end terminal;

responding to the end terminal with a call proceeding signal by the VMSC; and exchanging RAS admission request and admission confirmation signals between the VMSC and the gatekeeper.

10. The call-receiving method as claimed in claim 9, wherein a network communicating between the packet data network and the wireless communication device implements General Packet Radio Service.

11. The call-receiving method as claimed in claim 9, wherein the wireless communication device is a mobile phone and the end terminal is a H.323 terminal.

12. A call-receiving method allowing a mobile phone in a network implementing General Packet Radio Service to receive voice communications initiated by a H.323 terminal in a packet data network, comprising:

establishing a voice communication channel between a Voice-over-Internet-Protocol Mobile Switching Center ("VMSC") and the H.323 terminal, the VMSC communicating with the mobile phone through a circuit-switched network and with the H.323 terminal through a packet-switched network, the step of establishing a voice communication channel comprising:

performing Registration, Admission and Status ("RAS") admission request and setup procedures, wherein the H.323 terminal transmits a RAS admission request signal to a gatekeeper ("GK") of the packet data network, which contains the identity of the mobile phone, and the GK responds to the H.323 terminal with a RAS admission confirmation signal;

sending a setup signal to the VMSC by the H.323 terminal;

responding to the H.323 terminal with a call proceeding signal by the by the VMSC; and exchanging RAS admission request and admission confirmation signals between the VMSC and the GK;

paging the mobile phone;

performing channel assignment, authentication, and ciphering setup procedures for the mobile phone upon receiving a response from the mobile phone;

performing a call setup procedure for the mobile phone;

alerting the mobile phone and alerting the H.323 terminal;

connecting the H.323 terminal and the mobile phone through the VMSC; and activating voice communications for the mobile phone by the VMSC.

* * * * *